US012596604B2

(12) United States Patent
Jain

(10) Patent No.: US 12,596,604 B2
(45) Date of Patent: Apr. 7, 2026

(54) SYSTEMS AND METHODS FOR DATA MANAGEMENT

(71) Applicant: Capital One Services, LLC, McLean, VA (US)

(72) Inventor: Manav Jain, Broadlands, VA (US)

(73) Assignee: Capital One Services, LLC, McLean, VA (US)

( * ) Notice: Subject to any disclaimer, the term of this patent is extended or adjusted under 35 U.S.C. 154(b) by 87 days.

(21) Appl. No.: 18/409,897

(22) Filed: Jan. 11, 2024

(65) Prior Publication Data

US 2025/0231828 A1 Jul. 17, 2025

(51) Int. Cl.
*G06F 11/00* (2006.01)
*G06F 11/07* (2006.01)
*G06N 5/022* (2023.01)

(52) U.S. Cl.
CPC ........ *G06F 11/079* (2013.01); *G06F 11/0709* (2013.01); *G06F 11/0766* (2013.01); *G06N 5/022* (2013.01)

(58) Field of Classification Search
CPC . G06F 11/079; G06F 11/0709; G06F 11/0766
See application file for complete search history.

(56) References Cited

U.S. PATENT DOCUMENTS

| | | | |
|---|---|---|---|
| 10,120,923 B2 | 11/2018 | McClure et al. | |
| 10,791,150 B2 | 9/2020 | Barday et al. | |
| 10,909,093 B2 | 2/2021 | Panwar et al. | |
| 2025/0037206 A1* | 1/2025 | Derebail | G06Q 30/0205 |

* cited by examiner

*Primary Examiner* — Philip Guyton

(74) *Attorney, Agent, or Firm* — Bookoff McAndrews, PLLC

(57) ABSTRACT

A data management method may include receiving a use case, and receiving a configuration specific to the use case associated with an item type having a plurality of attributes. The configuration may define a target data store, a subset of the plurality of attributes associated with the use case, and a subset of optimal data sources from a plurality of available data sources each configured to provide one or more attributes within the subset of the plurality of attributes. The data management method may further include, based on the configuration, accessing, from the subset of optimal data sources, values corresponding to the subset of the plurality of attributes, and storing the values in the target data store.

20 Claims, 8 Drawing Sheets

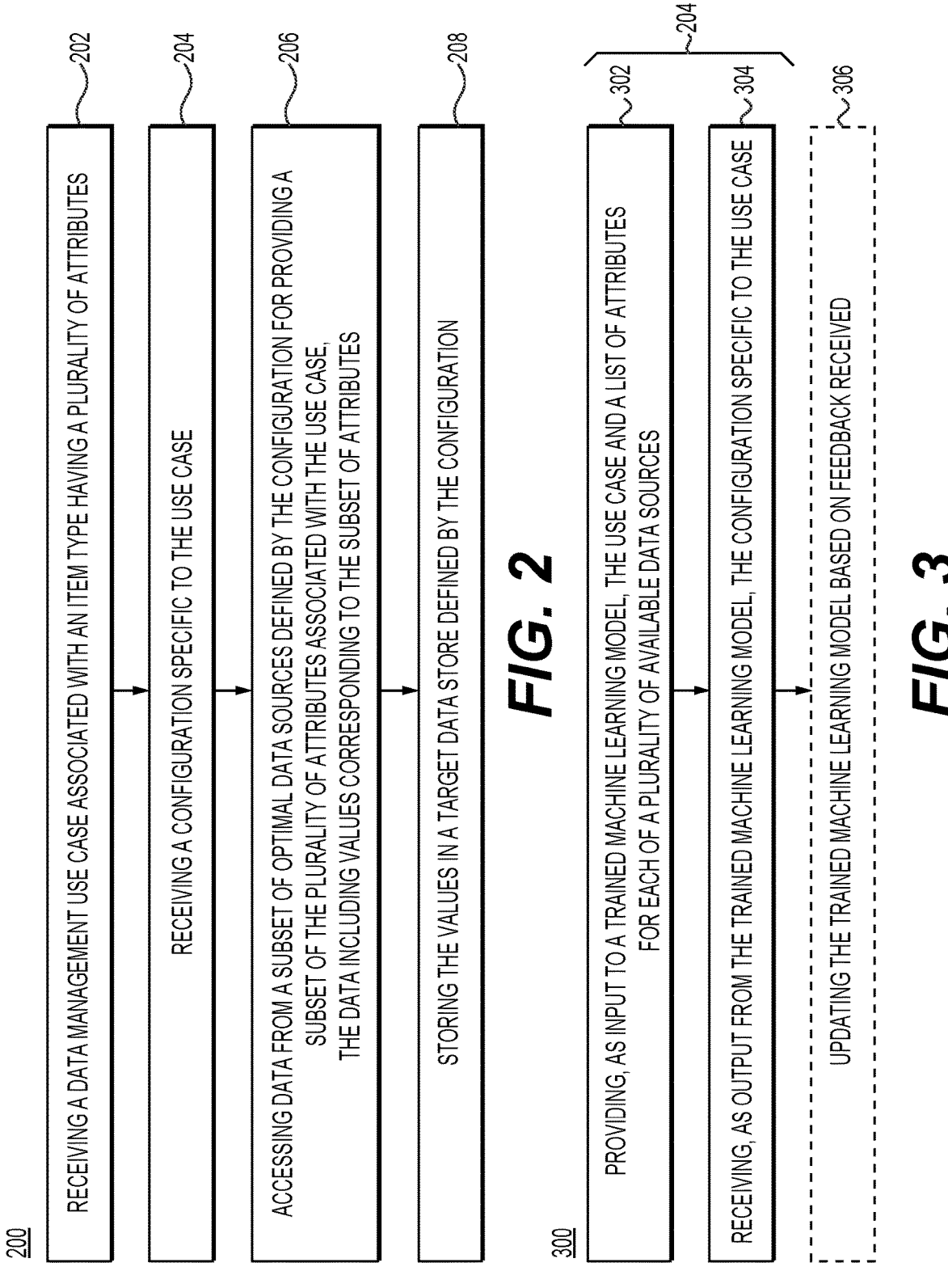

200

202 RECEIVING A DATA MANAGEMENT USE CASE ASSOCIATED WITH AN ITEM TYPE HAVING A PLURALITY OF ATTRIBUTES

204 RECEIVING A CONFIGURATION SPECIFIC TO THE USE CASE

206 ACCESSING DATA FROM A SUBSET OF OPTIMAL DATA SOURCES DEFINED BY THE CONFIGURATION FOR PROVIDING A SUBSET OF THE PLURALITY OF ATTRIBUTES ASSOCIATED WITH THE USE CASE, THE DATA INCLUDING VALUES CORRESPONDING TO THE SUBSET OF ATTRIBUTES

208 STORING THE VALUES IN A TARGET DATA STORE DEFINED BY THE CONFIGURATION

302 PROVIDING, AS INPUT TO A TRAINED MACHINE LEARNING MODEL, THE USE CASE AND A LIST OF ATTRIBUTES FOR EACH OF A PLURALITY OF AVAILABLE DATA SOURCES

304 RECEIVING, AS OUTPUT FROM THE TRAINED MACHINE LEARNING MODEL, THE CONFIGURATION SPECIFIC TO THE USE CASE

306 UPDATING THE TRAINED MACHINE LEARNING MODEL BASED ON FEEDBACK RECEIVED

*FIG. 3*

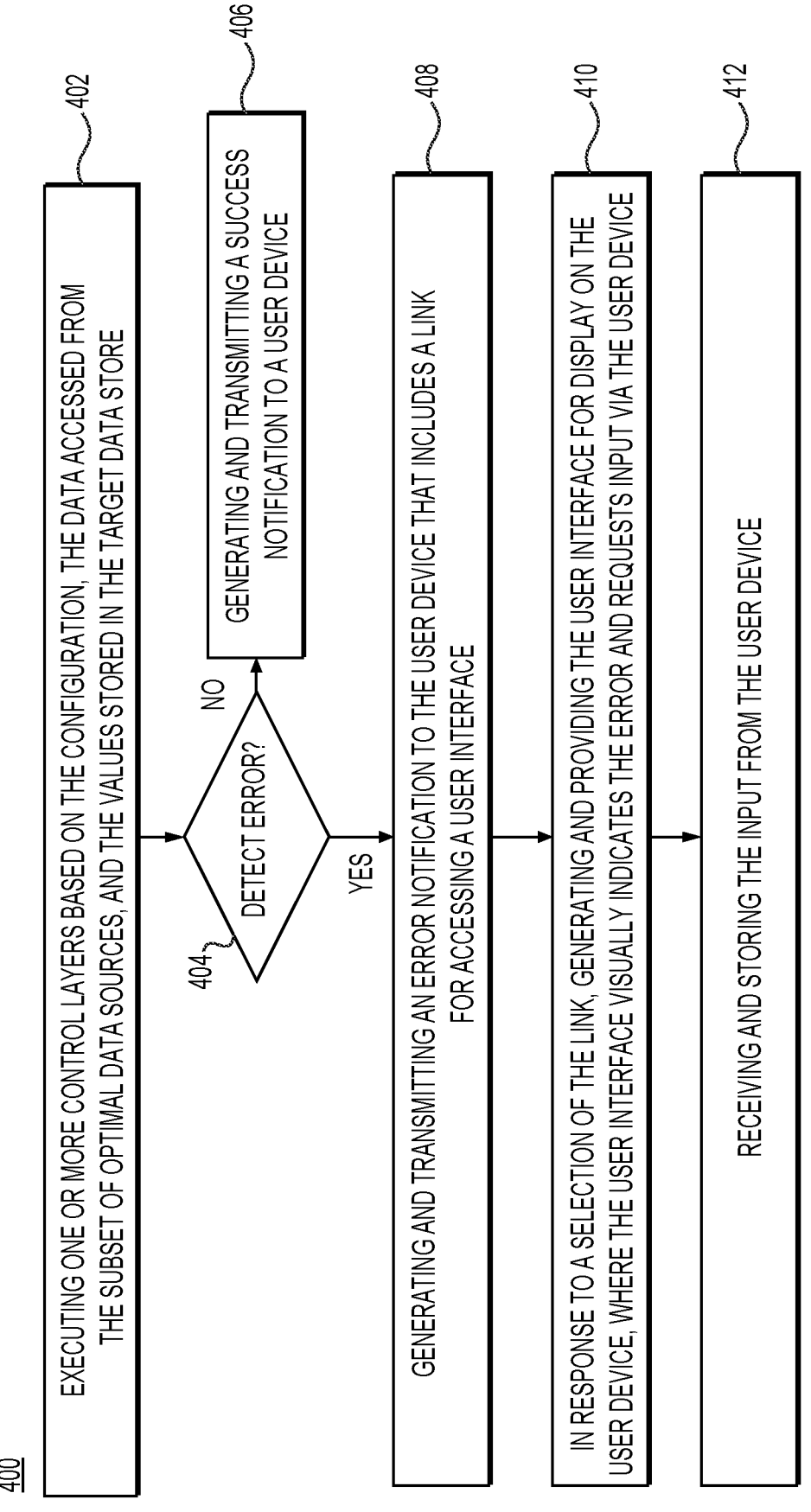

400

402 — EXECUTING ONE OR MORE CONTROL LAYERS BASED ON THE CONFIGURATION, THE DATA ACCESSED FROM THE SUBSET OF OPTIMAL DATA SOURCES, AND THE VALUES STORED IN THE TARGET DATA STORE

404 — DETECT ERROR?

NO

406 — GENERATING AND TRANSMITTING A SUCCESS NOTIFICATION TO A USER DEVICE

YES

408 — GENERATING AND TRANSMITTING AN ERROR NOTIFICATION TO THE USER DEVICE THAT INCLUDES A LINK FOR ACCESSING A USER INTERFACE

410 — IN RESPONSE TO A SELECTION OF THE LINK, GENERATING AND PROVIDING THE USER INTERFACE FOR DISPLAY ON THE USER DEVICE, WHERE THE USER INTERFACE VISUALLY INDICATES THE ERROR AND REQUESTS INPUT VIA THE USER DEVICE

412 — RECEIVING AND STORING THE INPUT FROM THE USER DEVICE

FIG. 4

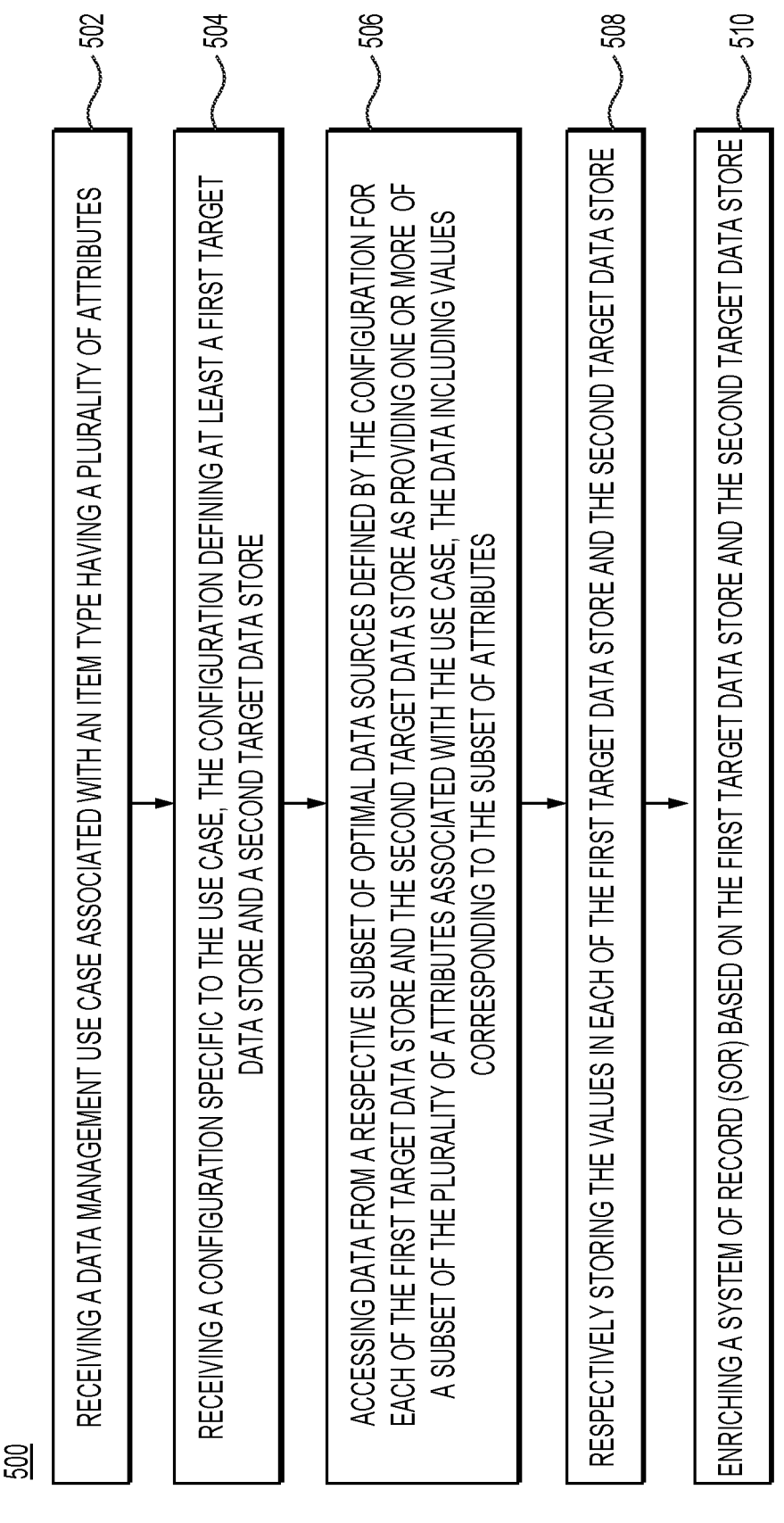

500

502 — RECEIVING A DATA MANAGEMENT USE CASE ASSOCIATED WITH AN ITEM TYPE HAVING A PLURALITY OF ATTRIBUTES

504 — RECEIVING A CONFIGURATION SPECIFIC TO THE USE CASE, THE CONFIGURATION DEFINING AT LEAST A FIRST TARGET DATA STORE AND A SECOND TARGET DATA STORE

506 — ACCESSING DATA FROM A RESPECTIVE SUBSET OF OPTIMAL DATA SOURCES DEFINED BY THE CONFIGURATION FOR EACH OF THE FIRST TARGET DATA STORE AND THE SECOND TARGET DATA STORE AS PROVIDING ONE OR MORE OF A SUBSET OF THE PLURALITY OF ATTRIBUTES ASSOCIATED WITH THE USE CASE, THE DATA INCLUDING VALUES CORRESPONDING TO THE SUBSET OF ATTRIBUTES

508 — RESPECTIVELY STORING THE VALUES IN EACH OF THE FIRST TARGET DATA STORE AND THE SECOND TARGET DATA STORE

510 — ENRICHING A SYSTEM OF RECORD (SOR) BASED ON THE FIRST TARGET DATA STORE AND THE SECOND TARGET DATA STORE

802  CONFIGURATION ERROR DETECTED

804  AN ERROR HAS BEEN DETECTED WITH THE CONFIGURATION FOR YOUR DATA MANAGEMENT USE CASE.

CLICK HERE TO SEE MORE INFORMATION.

700

702  CONFIGURATION SUCCESS

704  GREAT NEWS! THE CONFIGURATION FOR YOUR DATA MANAGEMENT USE CASE HAS BEEN INDEPENDENTLY VALIDATED.

CLICK HERE TO SEE MORE INFORMATION.

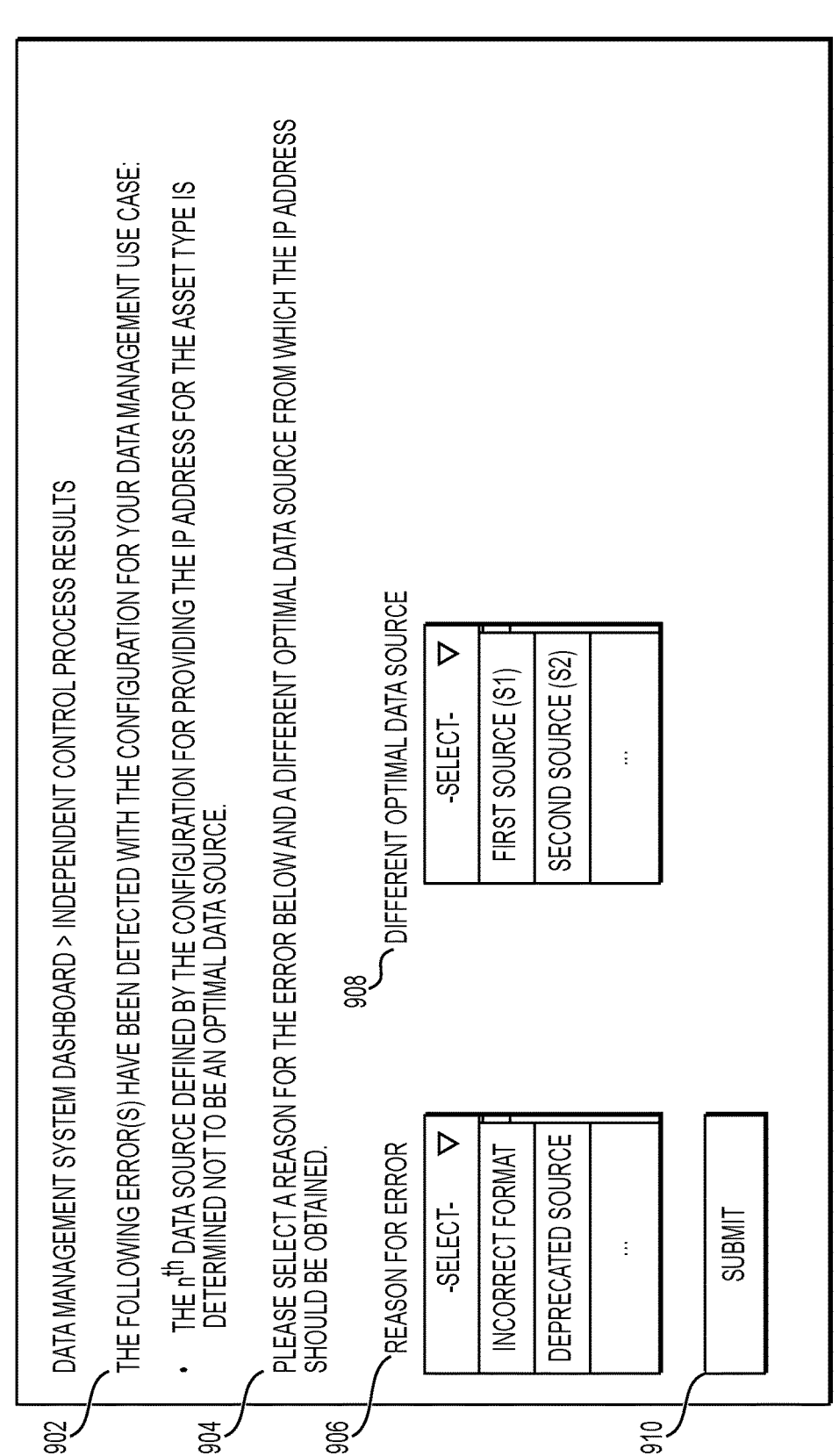

900

DATA MANAGEMENT SYSTEM DASHBOARD > INDEPENDENT CONTROL PROCESS RESULTS

902

THE FOLLOWING ERROR(S) HAVE BEEN DETECTED WITH THE CONFIGURATION FOR YOUR DATA MANAGEMENT USE CASE:

904

- THE $n^{th}$ DATA SOURCE DEFINED BY THE CONFIGURATION FOR PROVIDING THE IP ADDRESS FOR THE ASSET TYPE IS DETERMINED NOT TO BE AN OPTIMAL DATA SOURCE.

906

PLEASE SELECT A REASON FOR THE ERROR BELOW AND A DIFFERENT OPTIMAL DATA SOURCE FROM WHICH THE IP ADDRESS SHOULD BE OBTAINED.

908

DIFFERENT OPTIMAL DATA SOURCE

-SELECT- ▽

FIRST SOURCE (S1)

SECOND SOURCE (S2)

...

REASON FOR ERROR

-SELECT- ▽

INCORRECT FORMAT

DEPRECATED SOURCE

...

910

SUBMIT

FIG. 9

SYSTEMS AND METHODS FOR DATA MANAGEMENT

TECHNICAL FIELD

Various embodiments of this disclosure relate generally to techniques for data management, and, more particularly, to systems and methods for accessing, from optimal data sources defined by a use case-specific configuration associated with an item type, values corresponding to attributes of the item type for storage in a target data store.

BACKGROUND

An entity may include a plurality of assets. For asset management, data for each asset may be obtained and registered to a common data store in association with the asset. Depending on the asset management use case, data obtained may include attributes related to inventory, risk, ownership, or the like. There may be multiple data sources from which each portion of the data may be obtained, with new data sources frequently becoming available. The data sources may include the same or similar data attributes but define or format the attributes differently, which may result in one data source being optimal over another data source for obtaining a given portion of data.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for data management. The methods and systems may include accessing, from optimal data sources defined by a use case-specific configuration associated with an item type, values corresponding to attributes of the item type for storage in a target data store.

In some aspects, the techniques described herein relate to methods for data management. An example method may include receiving a data management use case, and determining, using a trained machine learning model, a configuration based on the use case. The configuration may be associated with an item type having a plurality of attributes. The configuration may define a target data store, a subset of the plurality of attributes associated with the use case, and a subset of optimal data sources from a plurality of available data sources each configured to provide one or more attributes within the subset of the plurality of attributes. The example method may also include: based on the configuration, accessing data from the subset of optimal data sources, the data including values corresponding to the subset of the plurality of attributes; storing the values in the target data store; and performing an independent control process based on the data accessed from the subset of optimal data sources, the configuration, and the values stored in the target data store, where the trained machine learning model may be updated based on feedback received when the independent control process detects an error.

In other aspects, the techniques described herein relate to methods for data management. An example method may include receiving a data management use case, and receiving a configuration specific to the use case associated with an item type having a plurality of attributes. The configuration may define a first target data store and a second target data store, and, for each of the first target data store and the second target data store: a subset of the plurality of attributes associated with the use case; and a subset of optimal data sources from a plurality of available data sources each configured to provide one or more attributes within the subset of the plurality of attributes. The example method may also include: based on the configuration, accessing data from the respective subset of optimal data sources for each of the first target data store and the second target data store, the data including values corresponding to the subset of the plurality of attributes; respectively storing the values in each of the first target data store and the second target data store; and enriching a system of record based on the first target data store and the second target data store.

In further aspects, the techniques described herein relate to methods for data management. An example method may include receiving a use case, and receiving a configuration specific to the use case associated with an item type having a plurality of attributes. The configuration may define a target data store, a subset of the plurality of attributes associated with the use case, and a subset of optimal data sources from a plurality of available data sources each configured to provide one or more attributes within the subset of the plurality of attributes. The example method may also include: based on the configuration, accessing, from the subset of optimal data sources, values corresponding to the subset of the plurality of attributes; and storing the values in the target data store.

BRIEF DESCRIPTION OF THE DRAWINGS

The accompanying drawings, which are incorporated in and constitute a part of this specification, illustrate various exemplary aspects and together with the description, serve to explain the principles of the disclosed aspects.

FIG. 2 depicts a flowchart of an exemplary data management process, according to certain aspects.

FIG. 3 depicts a flowchart of an exemplary configuration determination process, according to certain aspects.

FIG. 4 depicts a flowchart of an exemplary independent control process, according to certain aspects.

FIG. 5 depicts a flowchart of an exemplary system of record (SOR) enrichment process, according to certain aspects.

FIG. 9 depicts an exemplary user interface, according to certain aspects.

DETAILED DESCRIPTION

Figure 1:
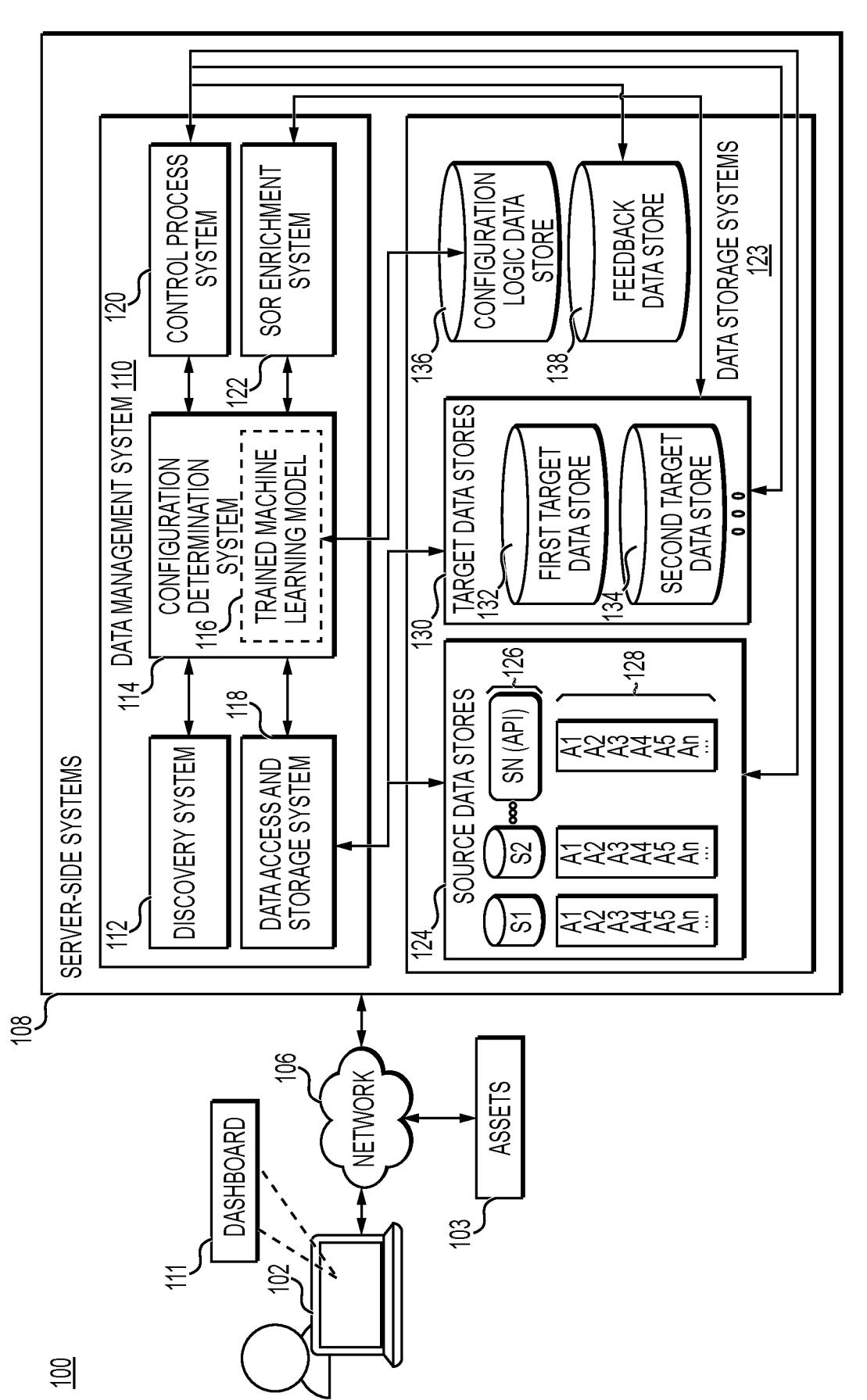
FIG. 1 depicts an exemplary environment for data management, according to certain aspects.

According to certain aspects of the disclosure, methods and systems are disclosed for data management. As will be discussed in more detail below, in various embodiments, systems and methods are described for best of breed data management, where a use case-specific configuration associated with an item type having a plurality of attributes may be determined. The configuration may be implemented to access values corresponding to a subset of the attributes from a subset of optimal data sources for storage in a target data store.

As briefly discussed above, an entity may include a plurality of assets. For asset management, data for each asset may be obtained and registered to a common data store in association with the asset. Depending on the asset management use case, data obtained may include attributes related to inventory, risk, ownership, or the like. There may be multiple data sources from which each portion of the data may be obtained, with new data sources frequently becoming available. The data sources may include the same or similar data attributes but define or format the attributes differently, which may result in one data source being optimal over another data source for obtaining a given portion of data.

Conventionally, a selection of a subset of attributes to obtain and the data sources from which to obtain the subset of attributes for a given data management use case may be performed based on knowledge from subject matter experts. Such reliance may create single points of failure for a data management system, and may fail to account for new data sources as they become available and provide opportunities for increased optimization. Such reliance may also cause governance and/or audit-related difficulties, as it may be challenging to provide evidence as to why a data attribute was accessed from a particular data source, and may require additional documentation or logging to be performed by the subject matter expert.

To address these challenges, systems and methods are described herein for automatically determining and implementing a configuration specific to a data management use case. In an exemplary use case, a received data management use case may be associated with an item type having a plurality of attributes, such as an asset. A configuration specific to the data management use case may define a subset of the attributes representing the best or most optimal attributes of the item type for serving the data management use case. The configuration may also define a subset of optimal data sources, selected from a plurality of available data sources, from which the subset of attributes are to be accessed. Further, the configuration may define a target data store to which the subset of attributes accessed from the subset of optimal data sources may be transferred to for storage.

As described in detail throughout the disclosure, in some examples, one or more machine learning models may be trained and used to determine the configuration. For example, a machine learning model may determine the configuration based on the data management use case and a plurality of attribute lists maintained for each of the plurality of available data sources, including new data sources as they are discovered. Accordingly, from the available data sources, a best or most optimal data source to provide an attribute from the subset of attributes at a given time may be defined by the determined configuration. As new data sources become available and/or as existing available data sources are updated, attributes and definitions associated with each of the attributes provided by the available data sources may be onboarded in near real-time for inclusion and/or updating of the lists.

Additionally, the configuration may be validated through an independent control process once values corresponding to the subset of attributes have been accessed from the subset of optimal data stores and stored in the target data store. For example, a plurality of control layers associated with data presence, data formatting, and/or data accuracy may be executed. Feedback and/or monitoring data from the independent control process may be utilized to adjust and/or re-train the machine learning models to improve the accuracy thereof in determining configurations. Additionally, the independent control process may facilitate automatic auditing by, for example, proactively monitoring for configuration errors and recording requested input associated with the errors to understand a reason for the error and/or any corrective or remedial actions taken. Further, associations may be gleaned between values stored between or among target data stores to enhance or enrich the data obtained for subsequent data exploration and/or analysis.

While specific examples included throughout the present disclosure involve asset management, it should be understood that techniques according to this disclosure may be adapted to any type of item having a plurality of attributes for which data is to be managed. Additionally, the methods and systems described herein may be applicable to any domain (e.g., any connected grouping of one or more computing devices and/or other devices on a network that are centrally administered or otherwise governed by a same authority), where data associated with the domain is received from various upstream systems or sources. It should also be understood that the examples above are illustrative only. The techniques and technologies of this disclosure may be adapted to any suitable activity.

Accordingly, reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" may convey "based at least in part on." The singular forms "a," "an," and "the" may include plural referents unless the context dictates otherwise. The term "exemplary" may be used in the sense of "example" rather than "ideal." The terms "comprises," "comprising," "includes," "including," or other variations thereof, may convey a non-exclusive inclusion such that a process, method, or product that comprises a list of elements does not necessarily include only those elements, but may include other elements not expressly listed or inherent to such a process, method, article, or apparatus. The term "or" may be interpreted disjunctively, such that "at least one of A or B" includes, (A), (B), (A and A), (A and B), etc. Similarly, the term "or" is intended to mean "and/or," unless explicitly stated otherwise. "And/or" may convey all permutations, combinations, subcombinations, and individual instances of items or terms included within a list of the items or terms.

Terms like "provider," "services provider," or the like may generally encompass an entity or person involved in providing, selling, and/or renting items to persons, as well as an agent or intermediary of such an entity or person. An "item" may generally encompass a good, service, or the like having ownership or other rights that may be transferred, such as data management services. As used herein, terms like "data manager", "administrator" or "user" generally encompass any person or entity that may interact with an application associated with the data management service provider to initiate and/or otherwise facilitate data management, for example. The term "application" may be used interchangeably with other terms like "program," "dashboard," or the like, and generally encompasses software that is configured to interact with, modify, override, supplement, or operate in conjunction with other software. The term "data management" may include management of any item type for which data is to be obtained and stored (e.g., registered) in a common data store.

The term "machine learning model" may generally encompass instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. The training data may be generated, received, and/or otherwise obtained from internal or external resources. Aspects of a machine learning system may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. Alternatively, reinforcement learning may be employed for training. For example, reinforcement learning may include training an agent interacting with an environment to make a decision based on the current state of the environment, receive feedback (e.g., a positive or negative reward based on accuracy of decision), adjusts its decision to maximize the reward, and repeat again until a loss function is optimized.

Presented below are various aspects of machine learning techniques that may be adapted for determining use case-specific configurations. As will be discussed in more detail below, the machine learning techniques may include one or more aspects according to this disclosure, e.g., a particular selection of training data, a particular training process for the machine learning models, operation of the machine learning models in conjunction with particular data, modification of such particular data by the machine learning models, etc., and/or other aspects that may be apparent to one of ordinary skill in the art based on this disclosure.

FIG. 1 depicts an exemplary environment 100 for data management, according to certain aspects, and which may be used with the techniques presented herein. A computing device 102 of a user may communicate with one or more of the other components of the environment 100 across electronic network 106, including one or more server-side systems 108, discussed below, to initiate and/or otherwise facilitate data management. The user may be a data manager or administrator of an entity. The user, among other roles, may be responsible for managing data for items of varying item types associated with the entity. As one non-limiting example, the items may include assets 103 provided by the entity to individuals associated with the entity (e.g., employees) to connect to the entity's network and/or software executing on the assets 103 to perform tasks. For example, the computing device 102 may be one of the assets 103 that forms, along with one or more other connected devices from the assets 103, a domain that is centrally administered or otherwise governed by the entity. The assets 103 may comprise a plurality of different asset types, such as laptops, tablets, etc.

Data management may be performed to obtain and store data for the items in a common data store (e.g., in one of target data stores 130 described below). The data may be inventory-related data, risk-related data, and/or ownership-related data, among other similar data, depending on the data management use case. The environment 100 of FIG. 1 shows one computing device 102. However, in other examples, there may be a plurality of computing devices 102 that are each communicating with one or more server-side systems 108 to initiate and/or otherwise facilitate data management of different item types, for example.

The server-side systems 108 may include a data management system 110 and/or a plurality of data storage systems 123, among other systems. In some examples, the data management system 110 and/or one or more of the data storage systems 123, may be associated with a common provider, e.g., a data management services provider. In such an example, the server-side systems 108 associated with the common provider may be part of a cloud service computer system (e.g., in a data center). In other examples, one or more of the components of the environment 100 may be associated with a different entity than another. For example, the data management system 110 may be associated with the data management services provider, and one or more of the data storage systems 123 may be associated with one or more third parties that provide data storage services to the data management services provider (e.g., the data management services provider subscribes to the third party to access data from the one or more of the data storage systems 123).

The above-provided examples are exemplary and non-limiting. The systems and devices of the environment 100 may communicate in any arrangement. As will be discussed herein, systems and/or devices of the environment 100 may communicate in order to perform data management processes, among other activities.

The computing device 102 may be configured to enable the user to access and/or interact with other systems in the environment 100. For example, the computing device 102 may be a computer system such as, for example, a desktop computer, a laptop computer, a tablet, a smart cellular phone, a smart watch or other electronic wearable, etc. In some embodiments, the computing device 102 may include one or more electronic applications, e.g., a program, plugin, browser extension, etc., installed on a memory of the computing device 102. In some embodiments, the electronic applications may be associated with one or more of the other components in the environment 100. For example, a dashboard 111 associated with the data management system 110 may be executed on the computing device 102 to enable the user to provide a data management use case to the data management system 110, and receive a visual indication of a success (or error) of a use case-specific configuration determined and implemented for the data management use case. In some examples, the applications, including the dashboard 111, may be thick client applications installed locally on the computing device 102 and/or thin client applications (e.g., web applications) that are rendered via the web browser launched on the computing device 102.

Additionally, one or more components of the computing device 102 may generate, or may cause to be generated, one or more graphic user interfaces (GUIs) based on instructions/information stored in the memory, instructions/information received from the other systems in the environment 100, and/or the like and may cause the GUIs to be displayed via a display of the computing device 102 (e.g., as separate notifications or as part of the dashboard 111). The GUIs may be, e.g., application interfaces or browser user interfaces and may include text, input text boxes, selection controls, and/or the like. The display may include a touch screen or a display with other input systems (e.g., a mouse, keyboard, etc.) for the user to control the functions of computing device 102.

The data management system 110 may include one or more server devices (or other similar computing devices) for executing data management services. Example data management services may broadly include tasks associated with: discovering available data sources from which data attributes associated with an item type may be obtained; determining a configuration for a data management use case associated with the item type; implementing the configuration to access values corresponding to a subset of the attributes from a subset of optimal data sources for storage in one or more target data stores; performing an independent control process to validate the configuration; and/or enriching an SOR. In some examples, and as shown in FIG. 1, the data management system 110 may include a plurality of subsystems for performing different tasks of the data management services, including: a discovery system 112, a configuration determination system 114, a data access and storage system 118, a control process system 120, and a SOR enrichment system 122, as described in detail elsewhere herein. In some examples, the configuration determination system 114 may be configured to execute a trained machine learning model 116 for determining the configuration for the data management use case.

The data storage systems 123 may include a server system or computer-readable memory such as a hard drive, flash drive, disk, etc. In some examples, the data storage systems 123 may include and/or interact with an application programming interface for exchanging data to other systems, e.g., one or more of the other components of the environment 100, such as the data management system 110 and the subsystems thereof. In other examples, one or more of the data storage systems 123 may be a sub-system or component of the data management system 110 (e.g., when the one or more data storage systems 123 are also provided by the data management services provider rather than a third party).

The data storage systems 123 may include and/or act as a repository or source for various types of data for the data management services. For example, the data storage systems 123 may include a plurality of source data stores 124, a plurality of target data stores 130, a configuration logic data store 136, and/or a feedback data store 138.

The source data stores 124 may include a plurality of available data sources 126 (e.g., S1-SN) from which data associated with an item type may be obtained. One example item type may include the assets 103 operating on the network 106. Another example item type may include software that executes on the assets 103. In some examples, each source data store 124 may be associated with one of the available data sources 126. In other examples, a given source data store 124 may be associated with two or more of the available data sources 126. The available data sources 126 may include a variety of data source formats, including databases (e.g., S1 and S2), application programming interfaces (APIs) (e.g., SN), flat files, or the like.

The available data sources 126 may be discovered or otherwise identified by the discovery system 112. For example, one or more agents of the discovery system 112 may be deployed on the various item types (e.g., on the assets 103). The agents may identify at least a portion of attributes 128 associated with the item type (e.g., A1-AN attributes) that may be captured by and accessible from each of the available data sources 126. For example, when the item type is a computing device asset (e.g., from the assets 103), examples of the attributes 128 identified may include a type of computing device asset, an operating system of the computing device asset, an Internet Protocol (IP) address of the computing device asset, a Media Access Control (MAC) address of the computing device asset, or the like.

The attributes 128 may be independently defined for each available data source 126. To provide a non-limiting example, a first attribute of a first data source (e.g., A1 of S1) may be an IP address for the computing device asset, and a first attribute of a second data source (e.g., A1 of S2) may indicate an owner of the computing device asset. Additionally, while two or more of the available data sources 126 may include a same attribute type as one of the defined attributes 128, features of the same attribute type, such as a format of the attribute type, may be different. To provide a non-limiting example, the first attribute of the first data source (e.g., A1 of S1) may be the IP address for the computing device asset in a first format, and a fourth attribute of the second data source (e.g., A4 of S2) may be the IP address for the computing device asset in a second format different from the first format, where one of the first or second format may be more optimal than the other for a given data management use case, as discussed in detail below.

In some examples, for each of the available data sources 126, the discovery system 112 may be configured to maintain a corresponding list of the attributes 128 and a definition associated with each attribute 128 in the list (e.g., the definition describing attribute type and features thereof). For example, the discovery system 112 may perform near real-time onboarding of the list of attributes 128 for each of the available data sources 126 as the available data sources 126 are newly discovered and/or as the available data sources 126 are updated.

Each of the target data stores 130, including at least a first target data store 132 and a second target data store 134, may be configured to serve as a common repository for data associated with a given item type and/or data management use case. For example, the first target data store 132 may be configured to store inventory data for an asset type, whereas the second target data store 134 may be configured to store ownership data associated with the asset type. In some examples, SOR enrichment system 122 may be configured to associate data from two or more of the target data stores 130. The associated data may be used to enhance or enrich data stored within the target data stores 130 and/or the associated data may be stored in a new data store or SOR (not shown). Continuing with the previous example, the SOR enrichment system 122 may associate assets accounted for in the inventory data for the asset type stored in the first target data store 132 with owners of the assets based on the ownership data stored in the second target data store 134.

The configuration logic data store 136 may be configured to store configuration logic for use in determining a use case-specific configuration. In some examples, the configuration logic data store 136 may specifically store one or more trained machine learning models, such as the trained machine learning model 116, that is retrieved and executed by the configuration determination system 114 of the data management system 110 to determine the use case-specific configuration. In some examples, the configuration logic data store 136 may store a trained machine learning model for each potential data management use case.

The feedback data store 138 may be configured to store feedback or monitoring data that is collected when the control process system 120 performs an independent control process to validate the configuration, for example. The feedback may be used to update or adjust the trained machine learning model 116 to improve the accuracy thereof, as described in detail elsewhere herein.

The network 106 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some aspects, the network 106 may be an internal and/or private network. In some examples, the network 106 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The computing device 102 and one or more of the server-side systems 108 may be connected via the network 106, using one or more standard communication protocols. The computing device 102 and one or more of the server-side systems 108 may transmit and receive communications from each other across the network 106, as discussed in more detail below.

Although depicted as separate components in FIG. 1, it should be understood that a component or portion of a component in the system of exemplary environment 100 may, in some embodiments, be integrated with or incorporated into one or more other components. For example, one or more of the subs-systems of data management system 110 may be integrated with one another, one or more of the data storage systems 123 may be integrated with the data management system 110, or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the computing device 102 or one or more of the server-side systems 108, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

FIG. 2 depicts a flowchart of an exemplary data management process 200, also referred to herein as the process 200. In some examples, various steps of the process 200 may be performed by the data management system 110 and various sub-systems thereof. At step 202, the process 200 may include receiving a data management use case associated with an item type having a plurality of attributes. The data management use case may be received via the dashboard 111 executing on the computing device 102. One example data management use case may include inventory management for a particular item type, such as a particular type of computing device asset (e.g., of the assets 103). Another example data management use case may include risk assessment for a particular item type. A further example data management use case may include ownership management for a particular item type.

At step 204, the process 200 may include receiving a configuration specific to the use case. In some examples, and as described in detail with reference to FIG. 3 below, the received configuration may be determined by the trained machine learning model 116 executed by the configuration determination system 114. In other examples, the configuration may be manually input by the user via the dashboard 111 and transmitted to the data management system 110 and/or otherwise retrieved based on configuration logic stored in the configuration logic data store 136. The configuration may define a target data store (e.g., one of the target data stores 130), a subset of the attributes of the item type associated with the use case (e.g., the attributes that are best or most optimal for serving the use case), and a subset of optimal data sources from the available data sources 126 each configured to provide one or more attributes within the subset of the attributes.

To provide an illustrative example, given an inventory management use case for a particular computing device asset type, such as laptops from the assets 103, the configuration may define the first target data store 132 as being configured to store laptop inventory data. The configuration may also define a first attribute subset comprising attributes whose values are to be stored as part of the laptop inventory data in the first target data store 132. The example attributes in the first attribute subset may include a type of laptop (e.g., personal computer (PC) or Mac), an operating system of the laptop, an IP address of the laptop, and/or a MAC address of the laptop.

The configuration may further define a first optimal data source subset that indicates, for each of the attributes in the first attribute subset, an optimal data source from the available data sources 126 from which the attribute values are to be accessed. Continuing with the illustrative example, a first data source (S1) of the available data sources 126 may be defined as the optimal data source for the operating system of the laptop and the MAC address of the laptop. A second data source (e.g., S2) of the available data sources 126 may be defined as the optimal data source for the type of laptop. An $n^{th}$ data source (e.g., SN) of the available data sources 126 may be defined as the optimal data source for the IP address of the laptop.

In some examples, the configuration may include the definition for the attribute as defined by the optimal data source (e.g., as defined in the list of attributes 128 maintained for each of the available data sources 126) to facilitate access to the values corresponding to the attribute by the data access and storage system 118, as described at step 206. For example, for the first data source (S1) of the available data sources 126 that is defined as the optimal data source for the operating system of the laptop and the MAC address of the laptop, the configuration may indicate that the operating system of the laptop is the second attribute defined by the first data source (e.g., A2 of S1) and the MAC address of the laptop is the fifth attribute defined by the first data source (e.g., A5 of S1).

In further examples, the configuration may also define an alternative optimal data source for one or more of the attributes in the first attribute subset. For example, if the value corresponding to the type of laptop is not accessible or otherwise retrieved from the second data source (e.g., S2), the configuration may define the $n^{th}$ data source (e.g., SN) as the alternative optimal data source for accessing the value corresponding to the type of laptop.

At step 206, the process 200 may include accessing data from the subset of optimal data sources defined by the configuration for providing the subset of the attributes associated with the use case. For example, the data accessed may include values corresponding to the subset of the attributes. In some examples, the data access and storage system 118 may receive and use the configuration to access the data from the subset of optimal data sources. For example, the data access and storage system 118 may subscribe or otherwise have access to the source data stores 124 associated with the subset of optimal data sources, and may query the associated source data stores 124 for the subset of the attributes based on the configuration. In response, the associated source data stores 124 may return the subset of attributes from the optimal data sources as query results.

At step 208, the process 200 may include storing the values in the target data store 130 defined by the configuration. For example, the data access and storage system 118 may store the subset of the attributes returned from the optimal data sources as query results in the target data store 130.

In some examples, and as described in detail below with reference to FIG. 4, the control process system 120 may then be configured to perform an independent control process to validate the process 200. The validation may be based on the configuration received at step 204, the data accessed from the subset of optimal data sources at step 206, and the values stored in the target data store at step 208. In further examples, and as described in detail below with reference to FIG. 5, the configuration may define more than one target data store 130, and the SOR enrichment system 122 may be configured to provide data enhancement and enrichment by associating the values stored in each target data store 130.

Accordingly, certain aspects may include data management processes. The process 200 described above is provided merely as an example, and may include additional, fewer, different, or differently arranged steps than depicted in FIG. 2.

FIG. 3 depicts a flowchart of an exemplary configuration determination process 300, also referred to herein as the process 300. In some examples, various steps of the process 300 may be performed by the configuration determination system 114 and/or the trained machine learning model 116. At least steps 302 and 304 of the process 300 may be used to perform at least part of step 204 of the process 200 described with reference to FIG. 2.

At step 302, the process 300 may include providing, as input to the trained machine learning model 116, the use case (e.g., received at step 202 of the process 200) and a list of attributes 128 for each of the plurality of available data sources 126. As described in detail above with reference to FIG. 1, the list of attributes 128 may be provided by the available data sources 126 upon discovery (e.g., by the discovery system 112) and/or in response to an update of the available data sources 126. The list of attributes 128 may include a definition associated with each attribute in the list. The definition associated with each attribute may include an identifier (e.g., representing the attribute type) and a format of the respective attribute. In some examples, the discovery system 112 may be configured to maintain and provide the list of the attributes 128 for each of the available data sources 126 to the configuration determination system 114 for use as input to the trained machine learning model 116.

In some examples, based on the use case, the configuration determination system 114 may be configured to retrieve the trained machine learning model 116, from among a plurality of trained machine learning models, stored in configuration logic data store 136. For example, the trained machine learning model 116 may be trained specifically for the use case and stored in association with the use case in the configuration logic data store 136, as described in more detail with reference to FIG. 6 below.

At step 304, the process 300 may include receiving, as output of the trained machine learning model 116, the configuration specific to the use case. As described above in detail with reference to the process 200, the configuration may include at least one target data store 130, a subset of the attributes of the item type associated with the use case, and a subset of optimal data sources from the available data sources 126 each configured to provide one or more attributes within the subset of the attributes.

At optional step 306, the process 300 may optionally include updating the trained machine learning model 116 based on feedback received. For example, and as described in more detail below, the control process system 120 may be configured to perform an independent control process. As part of the independent control process, an error associated with one or more of the subset of optimal data sources defined by the configuration may be detected and a reasoning for the error(s) may be requested as input via the dashboard 111, for example. The input received may be stored in the feedback data store 138, and used to update, adjust, or retrain the trained machine learning model 116.

In further examples, the trained machine learning model 116 may output a plurality of different configurations that may be provided to the computing device 102 for display via the dashboard 111. In some examples, distinctions among the different configurations and/or distinctions in a potential outcome of the data management use case may be included to facilitate a selection of which configuration of the plurality of different configurations are to be implemented. The selected configuration may then be used to perform steps 206 and 208 of the process 200.

Accordingly, certain aspects may include machine learning-based configuration determinations. The process 300 described above is provided merely as an example, and may include additional, fewer, different, or differently arranged steps than depicted in FIG. 3.

FIG. 4 depicts a flowchart of an exemplary independent control process 400, also referred to herein as the process 400. In some examples, various steps of the process 400 may be performed by the control process system 120. The process 400 may follow step 208 of the process 200 described with reference to FIG. 2.

At step 402, the process 400 may include executing one or more control layers based on the configuration (e.g., received at step 204 of the process 200), the data accessed from the subset of optimal data sources (e.g., at step 206 of the process 200), and the values stored in the target data store 130 (e.g., at step 208 of the process 200). The control layers may include a first control layer associated with a presence of the data, a second control layer associated with a format of the data, and/or a third control layer associated with a substantive accuracy of the data. The first, second, and/or third control layers may be executed in any order or arrangement. In some examples, the control layers may be executed sequentially. In other examples, two or more of the control layers may be executed in parallel.

The first control layer executed may include a first check as to whether a value corresponding to each attribute of the subset of attributes defined by the configuration is presently stored in the target data store 130. If a value corresponding to one or more attributes within the subset of attributes is not present in the target data store 130, an error may be detected (e.g., at step 404).

The second control layer may then be executed on each of the subset of attributes having a corresponding value presently stored in the target data store 130. The second control layer executed may include a second check as to whether a format of the value corresponding to each attribute of the subset of attributes presently stored in the target data store 130 is a correct format for the respective attribute (e.g., is stored in the format defined by the configuration). For example, the configuration may define a first format as optimal for a first attribute, and a first optimal data source may be defined by the configuration for providing the first attribute, at least in part, because the list of attributes 128 for the first optimal data source indicates the first attribute is stored in the first format. The second check may be used to verify that the first attribute is stored in the target data store 130 in the first format, and thus the first optimal data source from which the first attribute was accessed does in fact include the first attribute in the first format. If a format of the value corresponding to one or more attributes within the subset of attributes present in the target data store 130 is determined not to be in the correct format, an error may be detected (e.g., at step 404).

The third control layer may then be executed on each of the subset of attributes having a corresponding value presently stored in the target data store 130. In some examples, the third control layer may be performed after the second check. For example, the third control layer may be executed on each of the subset of attributes determined to have a correct format of a corresponding value presently stored in the target data store 130. In other examples, the third control layer may be performed concurrently with the second check. The third control layer executed may include a third check to verify a substantive accuracy of the corresponding value. The verification techniques applied to determine the substantive accuracy may be based on the use case and/or attribute type. As one non-limiting example, when the use case is inventory-related and the attribute type is the IP address of an asset (e.g., one of assets 103), the verification technique may include calling, by the control process system 120, the IP address using the corresponding value for the IP address stored in the target data store. If a response to the call is received, the substantive accuracy of the corresponding value for the IP address stored in the target data store 130 may be verified. As another non-limiting example, when the use case is ownership related and the attribute type is an owner username, the verification technique may include querying an entity data store configured to store owner information associated with the entity to which the control process system 120 has access. The entity data store may be queried using an owner identifier that is received in conjunction with the owner username to determine whether the corresponding value for the owner username stored in the target data store 130 is substantively accurate.

If the value corresponding to one or more attributes within the subset of attributes present in the target data store 130 is determined not to be substantively accurate, an error may be detected (e.g., at step 404). Otherwise, for a remaining subset of attributes having corresponding values present in the target data store that are in the correct format and are substantively accurate, no error may be detected (e.g., at step 404).

At step 404, a determination as to whether an error is detected may be made based on the execution of the one or more control layers at step 402. The error may indicate that one of the optimal data sources in the optimal data source subset defined by the configuration for providing one or more of the subset of attributes associated with the use case is determined not to be an optimal data source. For example, based on the execution of the first, second, and/or third control layers on the optimal data source defined by the configuration, the optimal data source may in fact be determined as non-optimal based on a failure of the data source to provide a corresponding value for storage in the target data store 130, a failure to provide the corresponding value in a correct or optimal format, and/or a failure to provide a substantively accurate corresponding value.

When no error is detected at step 404, the process 400 may proceed to step 406. At step 406, the process 400 may include generating and transmitting a success notification to a user device, such as the computing device 102 from which the use case was received at step 202 of the process 200. The success notification may indicate that each of the optimal data sources defined by the configuration for providing one or more of the subset of attributes associated with the use case are determined to be the optimal data source. The success notification may be generated and transmitted as a text message, an electronic mail communication, or a push notification (e.g., a push notification of the dashboard 111 associated with the data management system 110), among other examples. An example success notification is shown and described with reference to FIG. 7 below. If the success notification is provided as a separate notification (e.g., external to the dashboard 111), the success notification may also include a link for accessing a user interface configured to display additional information associated with the control layers executed and/or determinations made as part of the independent control process 400 (e.g., at steps 402 and 404). The user interface may be a user interface of the dashboard 111 displayed on the computing device 102.

When an error is detected at step 404, the process 400 may proceed to step 408 and/or 410. At step 408, the process 400 may include generating and transmitting an error notification to the user device, such as the computing device 102 from which the use case was received at step 202 of the process 200. The error notification may include a link for accessing a user interface. An example error notification is shown and described with reference to FIG. 8 below.

At step 410, the process 400 may include, in response to a selection of the link from the error notification, generating and providing the user interface for display on the user device. The user interface may visually indicate the error and request input via the user device. As one example, the user interface may be a user interface of the dashboard 111 displayed on the computing device 102. In some examples, when the dashboard 111 is already executing on the computing device 102, the process 400 may proceed directly from step 404 to the generating and display of the user interface at step 410 (e.g., the process 400 may skip the generation and transmission of the error notification at step 408).

The user interface may visually indicate any optimal data source defined by the configuration for providing one or more of the subset of attributes for which the error was detected. In other words, the optimal data source determined to not, in fact, be optimal for the one or more of the subset of attributes may be visually indicated. The visual indication of the error may include a flag, an alert, a color scheme (e.g., red or amber), an animation, or other similar visual scheme displayed in association with the non-optimal data source(s) on the user interface. In some examples, the user interface may also visually indicate the remaining optimal data sources from the subset of optimal data sources defined by the configuration that were determined to be optimal.

The input requested via the user interface may include a different optimal data source from the available data sources 126 for the one or more of the subset of attributes and a reason for the error. In some examples, and as shown in the exemplary user interface of FIG. 9, a plurality of predefined reasons may be generated and presented for display via the user interface for selection (e.g., via a drop down menu).

At step 412, the process 400 may include receiving and storing the input from the user device. For example, the different optimal data source and the reason received for the error as input may be stored in the feedback data store 138 and provided as feedback when updating, adjusting, or retraining the trained machine learning model 116 trained to determine configurations.

To provide an illustrative example, the configuration may have defined the $n^{th}$ data source (e.g., SN) of the available data sources 126 as the optimal data source for providing an IP address (e.g., one of the attributes in the subset). However, based on the execution of the one or more control layers at step 402, a determination is made that the $n^{th}$ data source (e.g., SN) is not in fact an optimal data source for providing the IP address, resulting in a detected error at step 404. As part of the input received from the user device at step 412, the user may indicate the first data source (e.g., S1) is the different optimal data source for providing the IP address, and may indicate the reason for the error (e.g., the reason $n^{th}$ data source is non-optimal) is the format of the IP address stored by the $n^{th}$ data source. Resultantly, the input received enables the trained machine learning model 116 to learn the underlying logic. For example, the $n^{th}$ data source had a first format (e.g., format A), which was indicated as a non-optimal format for the IP address, while the first data source indicated as the different optimal data source has a second format (e.g., format B). Based on this logic, additional weight for the IP address attribute variable in the trained machine learning model 116 may be applied to the first data source and/or any of the available data sources 126 having format B for the IP address attribute. Therefore, when determining a future configuration, the first data source and/or any of the available data sources 126 having format B for the IP address may be more likely to be defined as the optimal data source for providing the IP address.

Also, data from the different optimal data source received as input may be accessed by the data access and storage system 118 to obtain a different value corresponding to the one or more subset of attributes for storage in the target data store 130. The different value corresponding to each of the one or more subset of attributes may replace any of the values in the target data store 130 that were obtained from the non-optimal data source(s) for which an error was detected at step 404.

In addition to providing feedback for updating the trained machine learning model 116 and/or enabling value replacement in the target data store 130, performance of the process 400 may improve data resource utilization and/or efficiency. For example, if a percentage of data received from a given one of the available data sources 126 determined to be non-optimal through one or more iterations of the process 400 is above a threshold value (or the data thereof has to be constantly updated), the given available data source 126 may be removed or excluded from the available data sources 126 for future configuration determinations.

Further, performance of the process 400 may facilitate automatic auditing associated with the data management system 110. For example, the control process system 120, via the process 400, may also be configured to determine whether or not the data obtained and stored in the target data store(s) 130 based on the configuration is in alignment with one more governance rules. The governance rules may be rules associated with a domain of connected computing devices, including computing device 102, on the network 106. The determination may be recorded or otherwise logged and stored to enable the data management system 110 to be audit-ready in near-real time. As another example of audit-related features provided by the data management system 110, a decision may be made to block one of the assets 103 for which the data management is being provided because the operation of the respective asset 103 on the network 106 brought other services down. A date and time the asset was blocked and the reason for the block may be recorded in a log for storage. The stored log may then be utilized for auditing purposes.

Accordingly, certain aspects may include independent control processes, such as the process 400. The process 400 described above is provided merely as an example, and may include additional, fewer, different, or differently arranged steps than depicted in FIG. 4.

FIG. 5 depicts a flowchart of an exemplary SOR enrichment process 500, also referred to herein as the process 500. In some examples, various steps of the process 500 may be performed by the SOR enrichment system 122. The process 500 may be performed when a configuration defines more than one target data store 130.

At step 502, the process 500 may include receiving a data management use case associated with an item type having a plurality of attributes. The step 502 may be similar to the step 202 of the process 200 described above in detail with reference to FIG. 2.

At step 504, the process 500 may include receiving a configuration specific to the use case. The configuration may define at least the first target data store 132 and the second target data store 134. For each of the first target data store 132 and the second target data store 134, the configuration may further define a subset of the plurality of attributes associated with the use case, and a subset of optimal data sources from the available data sources 126 each configured to provide one or more of the subset of the attributes. For example, for the first target data store 132, the configuration may define a first attribute subset and a first optimal data source subset. For the second target data store 134, the configuration may define a second attribute subset and a second optimal data source subset.

At step 506, the process 500 may include accessing data from the respective subset of optimal data sources defined by the configuration for each of the first target data store 132 and the second target data store 134 as providing one or more of the subset of the plurality of attributes associated with the use case. The data accessed may include values corresponding to the subset of the plurality of attributes. For example, values corresponding to the first attribute subset may be accessed from the first optimal data source subset. Additionally, values corresponding to the second attribute subset may be accessed from the second optimal data source subset.

At step 508, the process 500 may include respectively storing the values in each of the first target data store 132 and the second target data store 134. For example, the values corresponding to the first attribute subset that are accessed from the first optimal data source subset at step 506 may be stored in the first target data store 132 at step 508. The values corresponding to the second attribute subset that are accessed from the second optimal data source subset at step 506 may be stored in the second target data store 134 at step 508.

At step 510, the process 500 may include enriching a SOR based on the first target data store 132 and the second target data store 134. For example, at least a subset of the values corresponding to the first attribute subsets stored in the first target data store 132 and a subset of the values corresponding to the second attribute subsets stored in the second target data store 134 may be associated with one another to provide further data management insights (e.g., data enrichment) for subsequent exploration and/or analysis. In some examples, a new target data store 130 or other similar data store may be generated to store the associated data. In other examples, the associated data may be used to enhance the data stored in the first target data store 132 and/or the second target data store 134.

As one non-limiting example, the first target data store 132 may store inventory data for an asset type (e.g., from the assets 103), whereas the second target data store 134 may store ownership data associated with the asset type. The assets 103 of the asset type for which inventory data is stored in the first target data store 132 may be associated with owners of the assets 103 based on the ownership data stored in the second target data store 134.

Accordingly, certain aspects may include SOR enrichment processes, such as the process 500. The process 500 described above is provided merely as an example, and may include additional, fewer, different, or differently arranged steps than depicted in FIG. 5.

Figure 6:
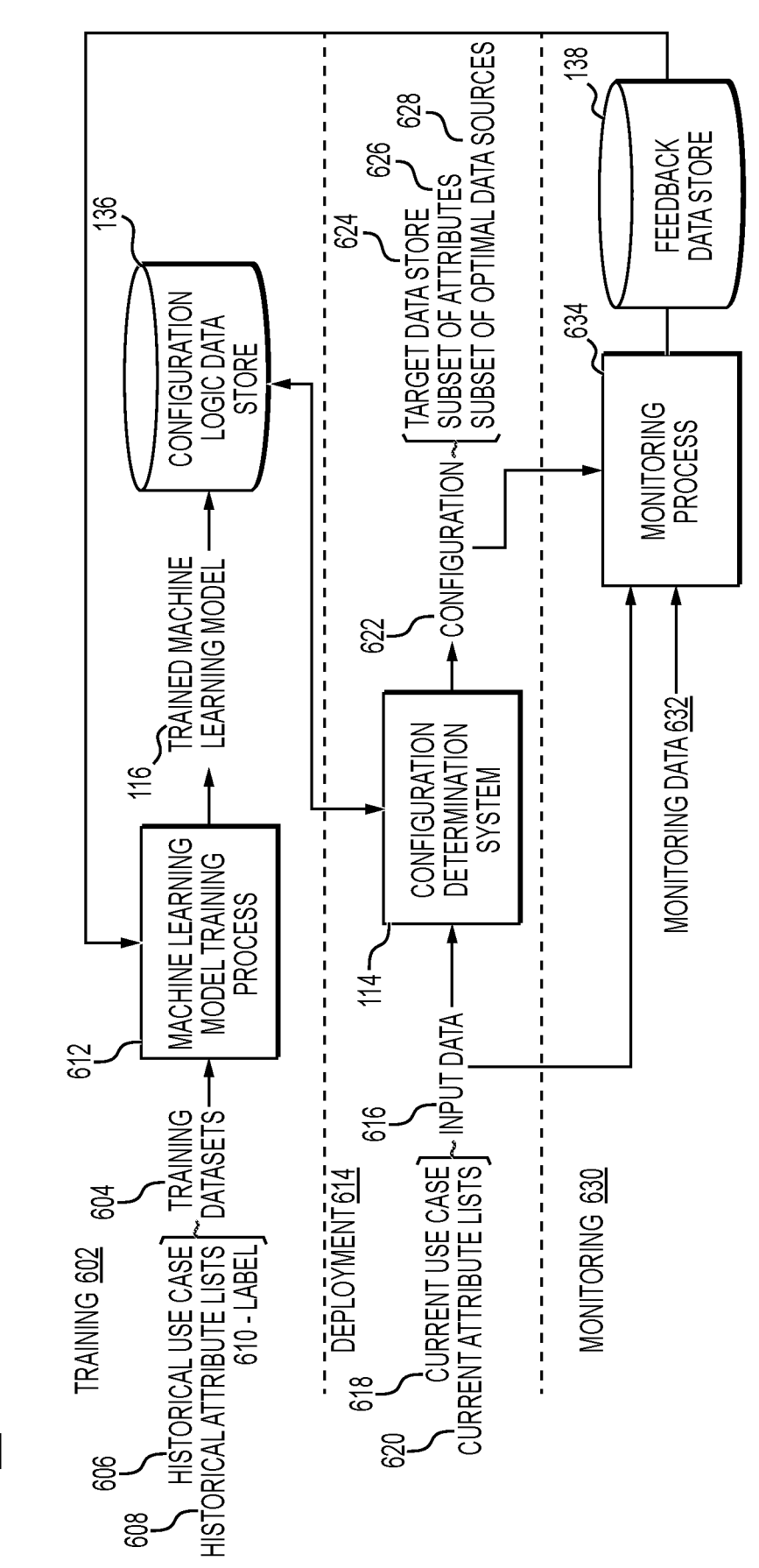
FIG. 6 depicts a block diagram of an exemplary process for training and using one or more machine learning models to determine a configuration specific to a data management use case, according to certain aspects.

FIG. 6 depicts a block diagram of an exemplary process 600 for training and using one or more machine learning models to determine a configuration specific to a data management use case. In some examples, the configuration determination system 114 may generate, store, train, and/or use one or more machine learning models, such as the trained machine learning model 116, configured to determine use case-specific configurations for data management. The configuration determination system 114 may include the machine learning models and/or instructions associated with the machine learning models, e.g., instructions for generating the machine learning models, training the machine learning models, using the machine learning models, etc. In other embodiments, a system or device other than the configuration determination system 114 may be used to generate and/or train the machine learning models. For example, such a system may include instructions for generating the machine learning models and the training data, and/or instructions for training the machine learning models. Resulting trained machine learning models, such the trained machine learning model 116, may then be provided to the configuration determination system 114 for use.

As depicted in FIG. 6, in some examples, the process 600 may include a training phase 602, a deployment phase 614, and a monitoring phase 630. In the training phase 602, at step 612, the process 600 may include receiving and processing a plurality of training datasets 604 to generate (e.g., build) a machine learning model, such as the machine learning model 116 for determining configurations specific to a data management use case.

An exemplary training dataset of the plurality of training datasets 604 may include a historical use case 606 for the data management and a plurality of historical attribute lists 608. The historical use case 606 may include a timestamp indicating a timeframe associated with the receipt of the historical use case 606. Each historical attribute list 608 may correspond to one of the available data sources 126 that was available (e.g., accessible) during that timeframe. Each historical attribute list 608 may include the attributes 128 provided by the respective available data source 126 during that timeframe and a definition associated with each attribute 128 in the list (e.g., the definition describing attribute type and features thereof). The historical attribute list 608 may have been provided by the respective available data source 126 and/or have been maintained by the discovery system 112. The exemplary training set may also include a corresponding label 610 that indicates a configuration that serves the historical use case 606 in view of the historical attribute lists 608 of the available data sources 126 during the timeframe in which the historical use case 606 was received. In other words, for a given historical use case 606 associated with an item type having a plurality of attributes, the corresponding label 610 may indicate the configuration that defines the best or most optimal subset of attributes for the item type to obtain to serve the historical use case 606, and the best or most optimal data sources available during that timeframe to access those optimal subset of attributes from. The training datasets 604 may be generated, received, or otherwise obtained from internal and/or external resources. For example, subject matter experts may annotate configurations for use as labels 610.

Generally, a model includes a set of variables, e.g., nodes, neurons, filters, etc., that are tuned, e.g., weighted or biased, to different values via the application of the training datasets 604. To provide an illustrative example, one variable may be an age and/or updating recency of a data source from the available data sources 126, and more (e.g., higher) weight may be given to the available data sources 126 that are newer and/or more recently updated. Another variable may be associated with a format in which data is stored by the available data sources 126. In some examples, the training process at step 612 may employ supervised, unsupervised, semi-supervised, and/or reinforcement learning processes to train the model (e.g., to result in the trained machine learning model 116). In some embodiments, a portion of the training datasets 604 may be withheld during training and/or used to validate the trained machine learning model 116.

When supervised learning processes are employed, the labels 610 corresponding to the training datasets 604 described above may facilitate the learning process by providing a ground truth. Training may proceed by feeding a historical use case 606 and the historical attribute lists 608 from the available data sources 126 of a training dataset (e.g., a sample) from the training datasets 604 into the model, the model having variables set at initialized values, e.g., at random, based on Gaussian noise, a pre-trained model, or the like. The model may output a configuration for the sample (e.g., predict a best or optimal configuration that will serve the historical use case 606). The output may be compared with the corresponding label 610 or score (e.g., the ground truth) indicating the optimal configuration to serve the historical use case 606 to determine an error, which may then be back-propagated through the model to adjust the values of the variables. This process may be repeated for a plurality of samples at least until a determined loss or error is below a predefined threshold. In some examples, some of the training datasets 604 may be withheld and used to further validate or test the trained machine learning model 116.

For unsupervised learning processes, the training datasets 604 may not include pre-assigned labels or scores to aid the learning process. Rather, unsupervised learning processes may include clustering, classification, or the like to identify naturally occurring patterns in the training datasets 604. K-means clustering or K-Nearest Neighbors may also be used, which may be supervised or unsupervised. Combinations of K-Nearest Neighbors and an unsupervised cluster technique may also be used. For semi-supervised learning, a combination of training datasets 604 with pre-assigned labels or scores and training datasets 604 without pre-assigned labels or scores may be used to train the model.

When reinforcement learning is employed, an agent (e.g., an algorithm) may be trained to make a decision regarding the configuration for the sample from the training datasets 604 through trial and error. For example, upon making a decision, the agent may then receive feedback (e.g., a positive reward if the predicted configuration is the optimal configuration), adjust its next decision to maximize the reward, and repeat until a loss function is optimized.

In some examples, the trained machine learning model 116 may be generated and/or trained such that is commonly used or applied for configuration determinations across all data management use cases. In other examples, separate, use case-specific trained machine learning models may be generated for each data management use case. For example, the trained machine learning model 116 may be a first trained machine learning model generated for inventory-related data management use cases, whereas a second machine learning model may be generated for risk-related data management use cases, a third machine learning model may be generated for ownership-related data management use cases, and so on.

Once trained, the trained machine learning model 116 may be stored (e.g., in the configuration logic data store 136) and subsequently applied by the configuration determination system 114 during the deployment phase 614. When a plurality of use case-specific machine learning models are generated and stored, the machine learning models may be stored in association with a use case identifier that indicates the specific use case the machine learning model is trained for to facilitate the subsequent retrieval and application.

During the deployment phase 614, the trained machine learning model 116 executed by the configuration determination system 114 may receive input data 616. The input data 616 may include a current use case 618 for data management that is associated with an item type having a plurality of attributes. For example, the current use case 618 may be received via the dashboard 111 executing on the computing device 102. In examples where a plurality of trained machine learning models are generated and stored in the configuration logic data store 136, the current use case 618 may be used to identify a respective trained machined learning model to retrieve from the configuration logic data store 136, such as the trained machine learning model 116, for execution. The input data 616 may also include current attribute lists 620 for each of the available data sources 126 that are currently available (e.g., accessible) at a time the current use case 618 is received.

The trained machine learning model 116 may provide, as output data, a configuration 622 to serve the current use case 618. The configuration 622 may define a target data store 624, a subset of attributes 626 of the item type to be optimally obtained based on the current use case 618, and a subset of optimal data sources 628 from which the subset of attributes 626 are to be accessed from for storage in the target data store 624. In some examples, the configuration 622 may be provided as input into other processes (not shown), such as to an independent control process performed by the control process system 120, as described above with reference to FIG. 4.

During the monitoring phase 630, feedback associated with the configuration 622 output by the trained machine learning model 116 may be received as monitoring data 632 and stored in the feedback data store 138. The feedback may include input requested and received during an independent control process, such as the process 400 described above with reference to FIG. 4. For example, for any error detected as a result of one or more of the subset of optimal data sources 628 defined by the configuration 622 being determined as non-optimal, the input may include a different optimal data source and the reason for the error.

During a monitoring process 634, the monitoring data 632 may be analyzed along with the input data 616 and the configuration 622 to determine an accuracy of the trained machine learning model 116. In some examples, based on the analysis, the process 600 may return to the training phase 602, where at step 612 values of one or more variables of the trained machine learning model 116 may be adjusted to improve the accuracy of the trained machine learning model 116. For example, the different optimal data source from which to obtain a value corresponding to a particular attribute (from the subset of attributes 626) for the current use case 618 indicated by the monitoring data 632 may be used as a portion of a label (e.g., similar to the label 610) to create a new training dataset 604 for use in retraining the trained machine learning model 116. Additionally or alternatively, the reason for the error can be used in conjunction with the different optimal data source to update trained machine learning model 116. To provide an illustrative example, if the reason for error was an incorrect first format of a given attribute, and the different optimal data source selected has a second format of the given attribute, the trained machine learning model 116 may be updated to weight data sources having the second format of the given attribute more heavily). In some examples, the trained machine learning model 116 may be retrained after a predefined number of new training datasets 604 have been received.

The exemplary process 600 described above is provided merely as an example, and may include additional, fewer, different, or differently arranged aspects than depicted in FIG. 6.

Figures 7, 8:
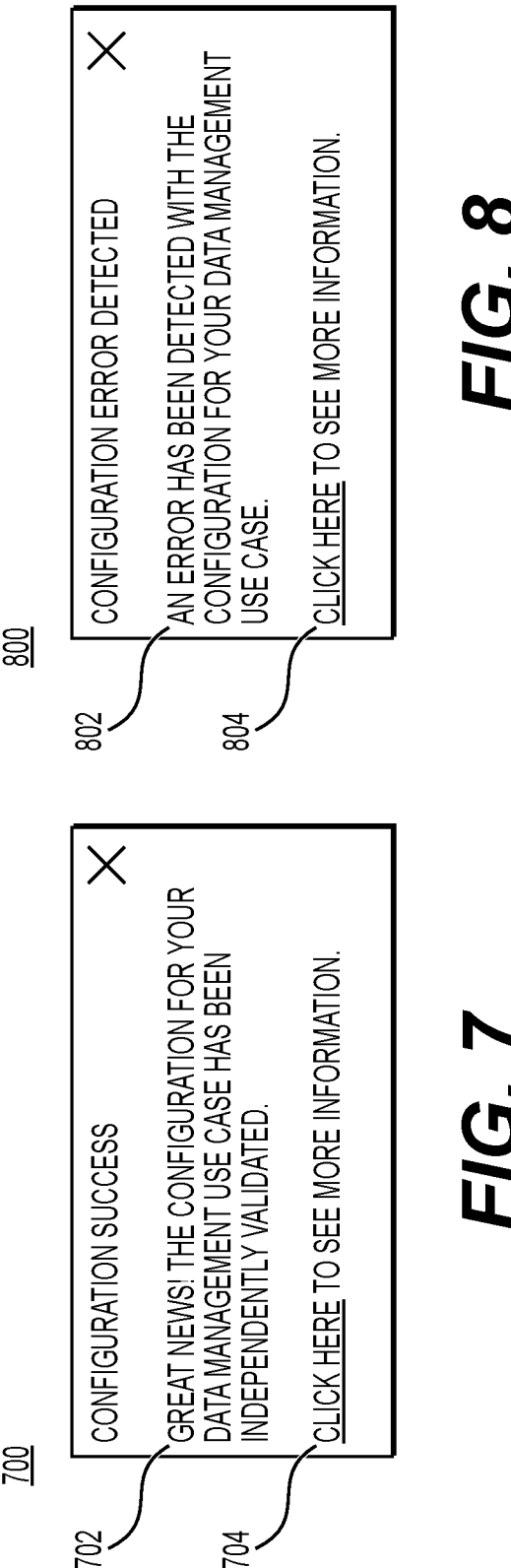
FIG. 7 depicts an exemplary success notification, according to certain aspects.
FIG. 8 depicts an exemplary error notification, according to certain aspects.

FIG. 7 depicts an exemplary success notification 700. The success notification 700 may be generated by the control process system 120, for example. The success notification 700 may be provided to the computing device 102 for display. In some examples, the success notification 700 may be provided as a text message, an electronic mail communication, or a push notification (e.g., a push notification of the dashboard 111 associated with the data management system 110), among other examples.

As shown, the success notification 700 may include an indication 702 that no error associated with a configuration, such as the configuration 622, was detected based on an independent control process, such as the process 400 performed by the control process system 120. For example, the indication 702 may include a confirmation that the configuration 622 determined by the configuration determination system 114 was independently validated. In addition to the text displayed within the success notification 700, visual schemes, such as color schemes (e.g., green color), animation schemes, or the like may be utilized to emphasize the success.

In some examples, and as shown in FIG. 7, the success notification 700 may also include a link 704 for accessing a user interface configured to display additional information associated with the independent control process. For example, the user interface may visually indicate that the subset of optimal data sources 628 defined by the configuration 622 are each determined to be optimal for the respective one or more of the subset of attributes 626 given the current use case 618. The user interface may be a user interface of the dashboard 111, similar to the user interface described below with reference to FIG. 9.

FIG. 8 depicts an exemplary error notification 800. The error notification 800 may be generated by the control process system 120, for example. The error notification 800 may be provided to the computing device 102 for display. In some examples, the error notification 800 may be provided as a text message, an electronic mail communication, or a push notification (e.g., a push notification of the dashboard 111 associated with the data management system 110), among other examples.

As shown, the error notification 800 may include an indication 802 that an error has been detected with a configuration, such as the configuration 622, based on an independent control process, such as the process 400, performed by the control process system 120. In addition to the text displayed within the error notification 800, visual schemes, such as color schemes (e.g., red or amber color), animation schemes, or the like may be utilized to emphasize the error. Additionally, the error notification 800 may include a link 804 for accessing a user interface configured to display additional information associated with the independent control process. The user interface may be a user interface of the dashboard 111, as described in detail below with reference to FIG. 9.

FIG. 9 depicts an exemplary user interface 900. The user interface 900 may be a user interface page of the dashboard 111 executing on the computing device 102. In some examples, the user interface 900 may be displayed in response to receiving a selection of the link 804 included in the error notification 800. In other examples, the user interface 900 may be independently navigated to within the dashboard 111. The user interface 900 may be configured to display results of an independent control process performed to validate a use case-specific configuration, such as results of the process 400 performed by the control process system 120 to validate the configuration 622.

The user interface 900 may include at least an indication 902 of the error detected with the configuration 622, and a prompt 904 requesting input via the user interface 900. To provide an illustrative example, the indication 902 may indicate that the $n^{th}$ data source defined by the configuration 622 as one of the subset of optimal data sources 628 for providing one of the subset of attributes 626 (e.g., an IP address) has been determined as non-optimal. The input requested by the prompt 904 may include a reason for the error 906 (e.g., a reason why the $n^{th}$ data source is non-optimal) and a different optimal data source 908 from the available data sources 126 from which the attribute (e.g., the IP address) should instead be obtained. As shown in FIG. 9, for each type of input requested by the prompt 904, a plurality of predefined reasons may be displayed (e.g., in a drop down menu) via the user interface 900 for selection. Upon selecting the reason for the error 906 and the different optimal data source 908, a submit control element 910 may then be selected to cause the selected reason for the error 906 and the different optimal data source 908 to be provided to the control process system 120.

Each of the success notification 700, the error notification 800, and the user interface 900 described above is provided merely as an example, and may include additional, fewer, different, or differently arranged information and/or interactive control elements than depicted in FIGS. 7-9, respectively.

In general, any process or operation discussed in this disclosure that is understood to be computer-implementable, such as the processes or operations depicted in FIGS. 2-9, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 10:
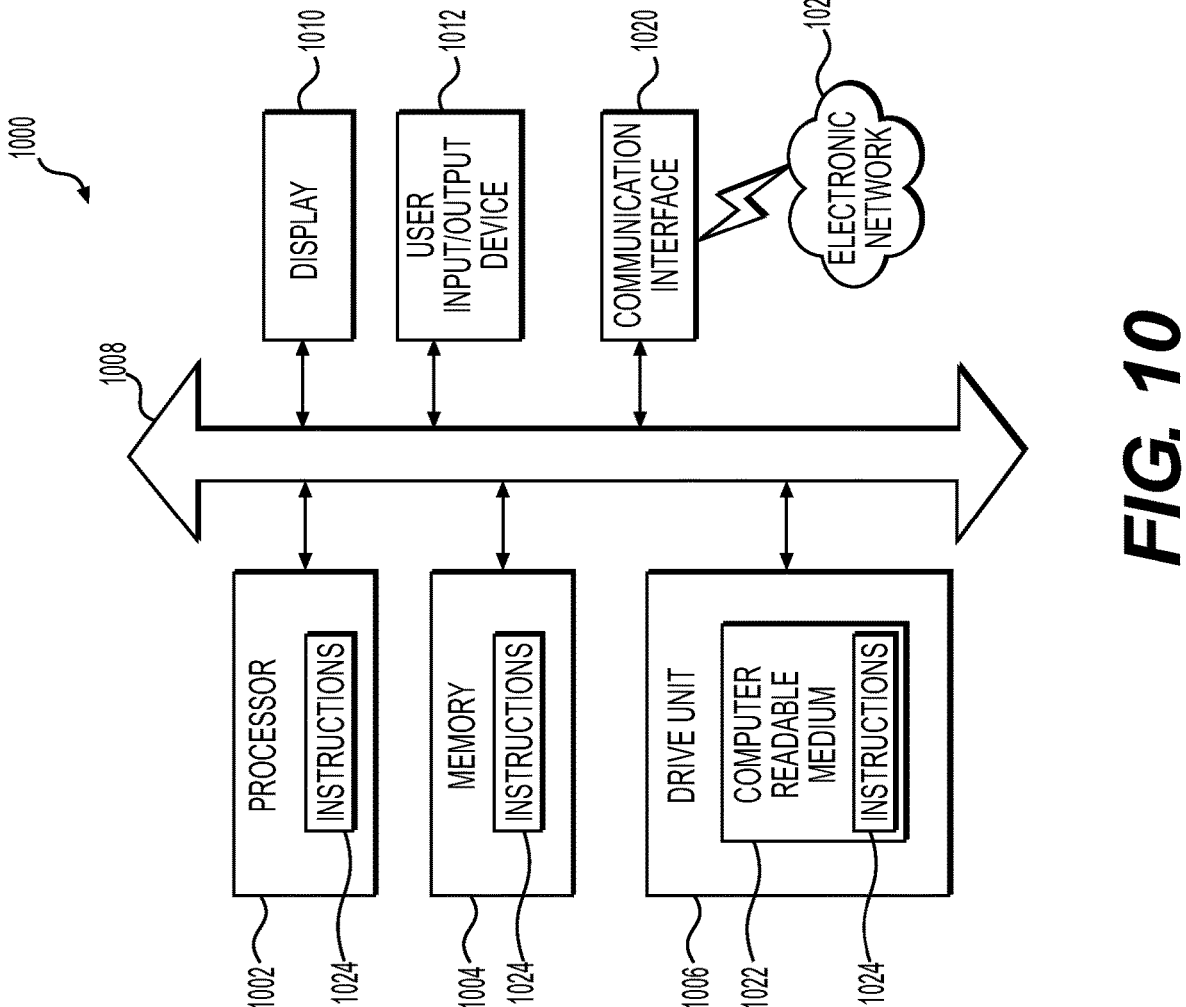
FIG. 10 depicts an example of a computer, according to certain aspects.

FIG. 10 depicts an example of a computer 1000, according to certain embodiments. FIG. 10 is a simplified functional block diagram of a computer 1000 that may be configured as a device for executing processes or operations depicted in, or described with respect to, FIGS. 2-9, according to exemplary embodiments of the present disclosure. For example, the computer 1000 may be configured as the computing device 102, one of the server-side systems 108, and/or another device according to exemplary embodiments of this disclosure. In various embodiments, any of the systems herein may be a computer 1000 including, e.g., a data communication interface 1020 for packet data communication. The computer 1000 may communicate with one or more other computers 1000 using the electronic network 1025. The electronic network 1025 may include a wired or wireless network similar to the network 106 depicted in FIG. 1.

The computer 1000 also may include a central processing unit ("CPU"), in the form of one or more processors 1002, for executing program instructions 1024. The program instructions 1024 may include instructions for running one or more applications, including the dashboard 111 associated with the data management system 110 (e.g., if the computer 1000 is the computing device 102). The program instructions 1024 may include instructions for running one or more operations of the server-side systems 108 (e.g., if the computer 1000 is a server device or other similar computing device of one or more of the respective server-side systems 108). The computer 1000 may include an internal communication bus 1008, and a drive unit 1006 (such as read-only memory (ROM), hard disk drive (HDD), solid-state disk drive (SDD), etc.) that may store data on a computer readable medium 1022, although the computer 1000 may receive programming and data via network communications. The computer 1000 may also have a memory 1004 (such as random access memory (RAM)) storing instructions 1024 for executing techniques presented herein, although the instructions 1024 may be stored temporarily or permanently within other modules of computer 1000 (e.g., processor 1002 and/or computer readable medium 1022). The computer 1000 also may include user input and output ports 1012 and/or a display 1010 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to training and/or using one or more trained machine learning models for determining use case-specific configurations, any suitable activity may be used.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for data management, the method comprising:

receiving a data management use case;

determining, using a trained machine learning model, a configuration based on the use case, wherein the configuration is associated with an item type having a plurality of attributes, and the configuration defines:

a target data store;

a subset of the plurality of attributes associated with the use case; and a subset of optimal data sources from a plurality of available data sources each configured to provide one or more attributes within the subset of the plurality of attributes;

based on the configuration, accessing data from the subset of optimal data sources, the data including values corresponding to the subset of the plurality of attributes;

storing the values in the target data store;

performing an independent control process based on the data accessed from the subset of optimal data sources, the configuration, and the values stored in the target data store;

detecting, based on the independent control process, an error associated with one or more of a presence, a format, or a substantive accuracy of a first value corresponding to a first attribute, from the values corresponding to the subset of the plurality of attributes, the error indicating a first optimal data source of the subset of optimal data sources from which the first value was obtained is a non-optimal data source for providing the first attribute; and receiving, as feedback from the independent control process, a second optimal data source for obtaining the first attribute to remedy the error and a reason for the error associated with the first optimal data source, wherein a second value corresponding to the first attribute is accessed from the second optimal data source, the first value is replaced with the second value in the target data store, and the trained machine learning model is updated based on the feedback to learn a relationship between the reason for the error and the second optimal data source for use in defining optimal data sources in future configuration determinations received when the independent control process detects an error.

2. The method of claim 1, wherein:

the target data store is a first target data store, the subset of the plurality of attributes are a first attribute subset, and the subset of optimal data sources are a first optimal data source subset; and the configuration further defines a second target data store, a second attribute subset, and a second optimal data source subset.

3. The method of claim 2, further comprising:

based on the configuration, accessing data from the second optimal data source subset, the data including values corresponding to the second attribute subset; and storing the values corresponding to the second attribute subset in the second target data store.

4. The method of claim 3, further comprising:

enriching a system of record based on the first target data store and the second target data store.

5. The method of claim 1, wherein the trained machine learning model receives, as input, the use case and, for each of the plurality of available data sources, a list of attributes provided by the respective available data source and a definition associated with each attribute in the list of attributes.

6. The method of claim 5, wherein the definition associated with each attribute includes one or more of an identifier and a format of the respective attribute.

7. The method of claim 1, wherein performing the independent control process comprises:

executing one or more control layers, the one or more control layers including at least one of: a first layer associated with a presence of the data, a second layer associated with a format of the data, or a third layer associated with a substantive accuracy of the data.

8. The method of claim 1, wherein performing the independent control process comprises:

generating and transmitting a notification to a user device, the notification indicating the error that was detected and a link for accessing a user interface configured to display additional information associated with the independent control process.

9. The method of claim 1, wherein performing the independent control process comprises:

generating a user interface for display on a user device, wherein the user interface visually indicates whether the subset of optimal data sources defined by the configuration are each determined to be optimal for the respective one or more attributes within the subset of the plurality of attributes.

10. The method of claim 9, wherein, based on detecting the error, the user interface visually indicates at least the first optimal data source is a non-optimal data source and requests input via the user device, the input requested including a different optimal data source from the plurality of available data sources for the first attribute and one or more reasons for the error.

11. The method of claim 10, wherein the user interface presents a plurality of predefined reasons for selection, and receiving the reason for the error associated with the first optimal data source comprises:

receiving a selected predefined reason from the plurality of predefined reasons.

12. A method for data management, the method comprising:

receiving a data management use case;

receiving a configuration specific to the use case associated with an item type having a plurality of attributes, the configuration defining:

a first target data store and a second target data store; and for each of the first target data store and the second target data store:

a subset of the plurality of attributes associated with the use case; and a subset of optimal data sources from a plurality of available data sources each configured to provide one or more attributes within the subset of the plurality of attributes;

based on the configuration, accessing data values from the respective subset of optimal data sources for each of the first target data store and the second target data store, the data values corresponding to the subset of the plurality of attributes;

respectively storing the data values in each of the first target data store and the second target data store;

validating the configuration based on the data values;

based on the validating, identifying an error associated with one or more of the data values accessed from a first optimal data source of the respective subset of optimal data sources;

in response to determining a percentage of data values accessed from the first optimal data source for which errors are identified is above a threshold value, excluding the first optimal data source from the plurality of available data sources in future configuration determinations; and enriching a system of record based on the first target data store and the second target data store.

13. The method of claim 12, wherein enriching the system of record comprises:

associating the data values stored in the first target data store with the data values stored in the second target data store.

14. The method of claim 12, wherein the configuration is received as output from a trained machine learning model, the trained machine learning model having determined the configuration based on inputs including the use case and, for each of the plurality of available data sources, a list of attributes provided by the respective available data source and a definition associated with each attribute in the list of attributes.

15. The method of claim 14, wherein validating the configuration comprises:

performing an independent control process, wherein the trained machine learning model is updated based on feedback from the independent control process associated with the error.

16. The method of claim 15, wherein performing the independent control process comprises:

executing one or more control layers, the one or more control layers including at least one of: a first layer associated with a presence of the data values, a second layer associated with a format of the data values, or a third layer associated with a substantive accuracy of the data values.

17. The method of claim 15, wherein performing the independent control process comprises:

generating and transmitting a notification to a user device, the notification indicating the error and a link for accessing a user interface configured to display additional information associated with the independent control process.

18. The method of claim 15, wherein performing the independent control process comprises:

generating a user interface for display on a user device, wherein the user interface visually indicates whether the subset of optimal data sources defined by the configuration are each determined to be optimal for the respective one or more attributes within the subset of the plurality of attributes.

19. The method of claim 18, wherein, based on the error, the user interface visually indicates the first optimal data source is a non-optimal data source for a respective one or more attributes within the subset of the plurality of attributes and requests input via the user device, the requested input including a different optimal data source from the plurality of available data sources for the respective one or more attributes within the subset of the plurality of attributes and a reason for the error.

20. A method for data management, the method comprising:

receiving a plurality of use cases;

for each use case of the plurality of use cases:

receiving a configuration specific to the use case associated with an item type having a plurality of attributes, the configuration defining:

a target data store;

a subset of the plurality of attributes associated with the use case; and a subset of optimal data sources from a plurality of available data sources each configured to provide one or more attributes within the subset of the plurality of attributes;

based on the configuration, accessing, from the subset of optimal data sources, values corresponding to the subset of the plurality of attributes;

storing the values in the target data store; and performing an independent control process to detect any errors associated with the values stored in the target data store, wherein detecting an error indicates at least one of the subset of optimal data sources is a non-optimal data source for providing a respective attribute within the subset of the plurality of attributes;

determining, based on the independent control process performed for each use case of the plurality of use cases, an amount of data accessed from an available data source of the plurality of available data sources resulting in detected errors is above a threshold; and based on the determination, excluding the available data source from the plurality of available data sources in future configuration determinations.

* * * * *